Patented June 24, 1947

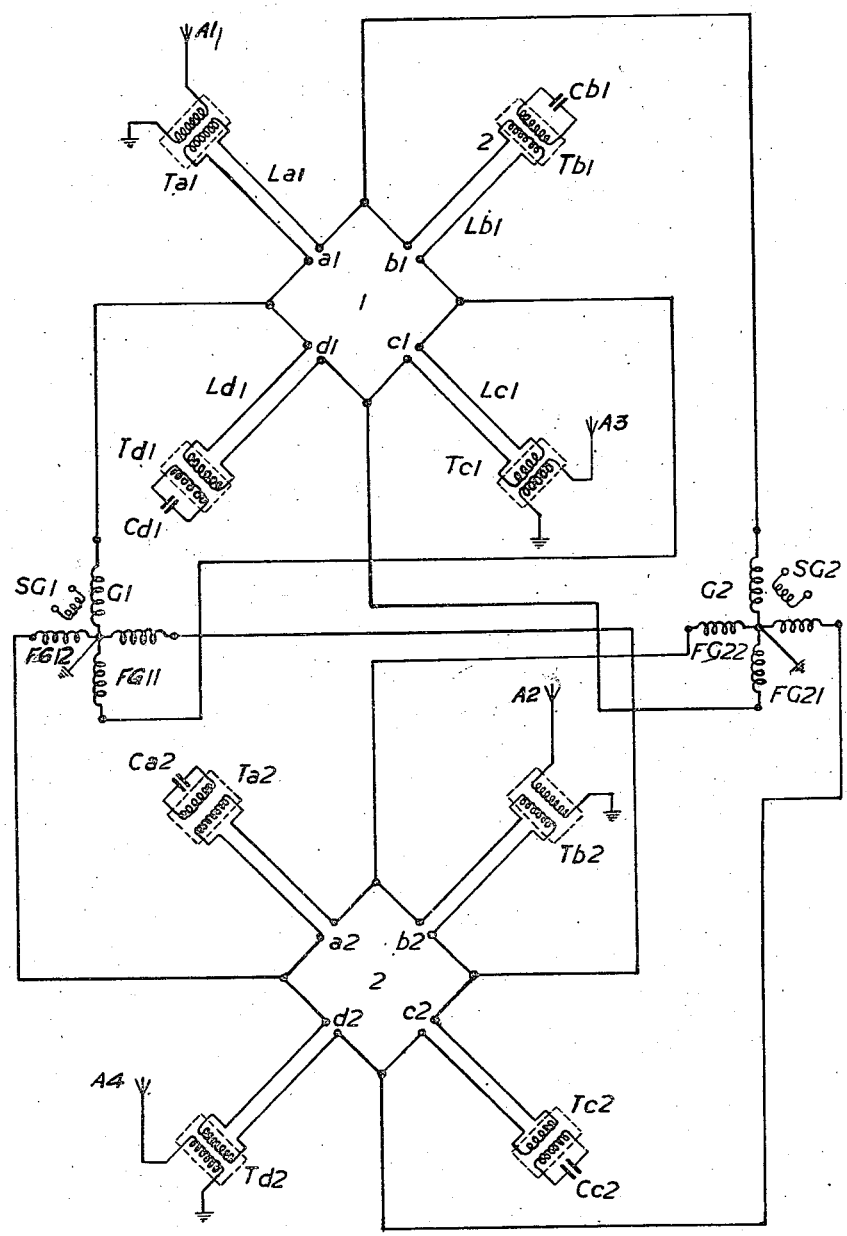

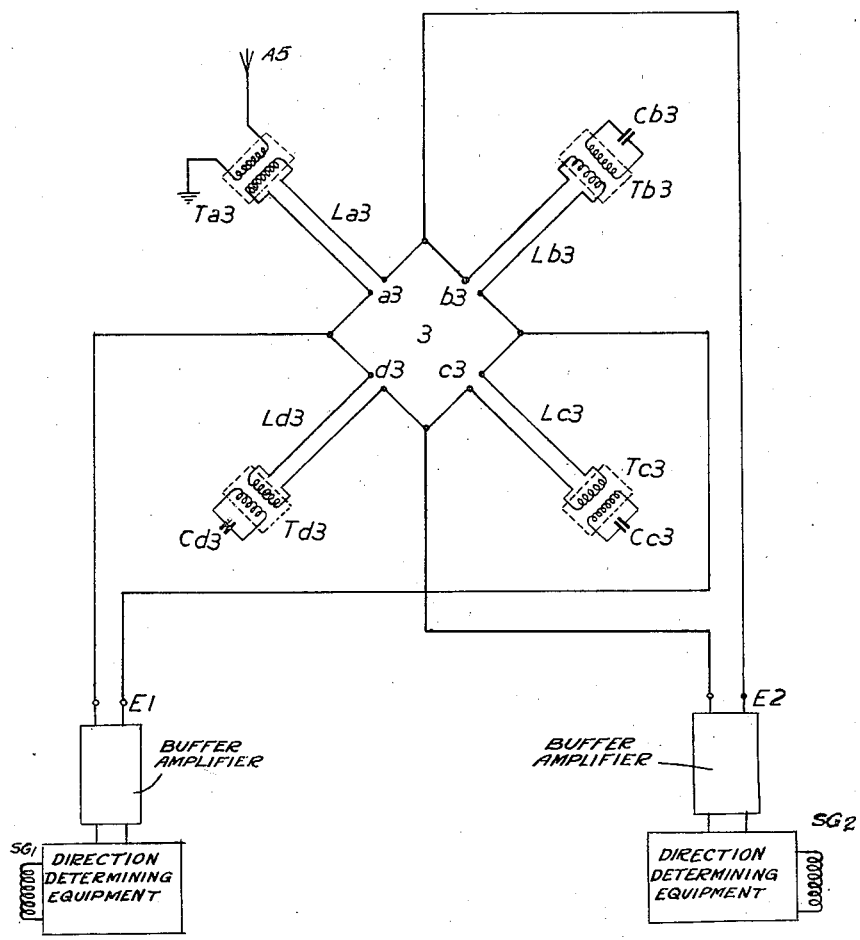

2,423,064

UNITED STATES PATENT OFFICE 2,423,064

RADIO DIRECTION FINDING EQUIPMENT

Charles William Earp, Ivor Reginald John James, and Richard Francis Cleaver, London W. C. 2, England, assignors to Standard Telephones and Cables Limited, London, England, a British company Application November 23, 1942, Serial No. 466,654
In Great Britain February 9, 1940

Section 1, Public Law 690, August 8, 1946.
Patent expires February 9, 1960

7 Claims. (Cl. 250—11)

The present invention relates to arrangements for utilising two equipments with a single source of energy, and is particularly applicable to radio direction finding systems in which two radio direction finding equipments are associated with the same antenna system.

The object of the invention is to provide arrangements utilising two equipments with the same source of electrical energy, such as an antenna system, whether the frequencies utilised by the equipments are the same, or not, in such a manner as to avoid interference between the two equipments.

According to the broadest aspect of the invention, arrangements for utilising two equipments with a common source of energy in which interference between the two equipments is avoided, comprises a bridge arrangement in which one arm contains the source or a pair of opposite arms each contain a similar source and the remaining arms each contain impedances which balance the said bridge, the input to one equipment being taken from one pair of opposite corners of the bridge and the input to the other equipment being taken from the other pair of opposite corners of the bridge.

The source of energy may in particular be a non-directional antenna system, which feeds into one arm of the bridge, the impedances of the other arms of the bridge being designed to balance the bridge and the inputs to the two equipments being taken from the respective pair of opposite corners of the bridge.

In some cases of directional radio systems two non-directional aerials are employed and coupled together so as to form a single source of supply. In such a case one aerial is arranged to feed into one arm of the bridge and the other aerial is arranged to feed into the opposite arm of the bridge, the impedances of the remaining arms being designed to balance the bridge.

Further, in the case when an Adcock antenna system is used with two direction finding equipments, each pair of coupled aerials is associated with a bridge as just described, and the inputs to the equipment from the two pairs of aerials being taken from a pair of opposite corners on each bridge.

When a non-directional antenna system is employed with either of the directional systems described in the two preceding paragraphs an additional bridge arrangement associated with the non-directional system as hereinbefore described is necessary, and the required inputs for the two equipments are taken from the two pairs of opposite corners of the bridge.

In order to render the invention clearer, a description thereof as embodied in a radio direction finding system utilising an antenna system of the Adcock type will now be described with reference to the accompanying drawings in which:

Fig. 1 shows the two bridge circuits associated with the two pairs of aerials of the Adcock system; and Fig. 2 shows the bridge circuit of the non-directional aerial which may be used in conjunction with the system of Fig. 1 when the "sense" of direction is required.

In the drawings the three bridges are designated 1, 2 and 3 respectively and the respective arms are designated $a$, $b$, $c$, $d$, followed by a numeral indicating the appropriate bridge. Other elements associated with the bridges and which are similar are given similar characteristic designations followed by the designation of the bridge arm with which the element is associated, for example $La_1$, $Ld_3$.

An Adcock aerial system consists as is well known of four vertical antennae placed one at each corner of a square and for "sense" determination, a fifth aerial at the intersection of its diagonals. When one receiving equipment only is used one pair of diagonally opposite aerials feed into one field coil of a goniometer having two field coils angularly disposed with respect to each other, and the other pair of diagonally opposite aerials feed into the other goniometer field coil. If, when operating two receiving equipments, the corresponding field coils of the two goniometers were connected in parallel directly across the cables leading from the diagonally opposite aerials, interaction would take place between the two goniometers. To overcome this difficulty, the arrangements embodying the present invention and about to be described are provided.

Referring to Fig. 1 of the drawings, each bridge arm $a$, $b$, $c$, $d$, is composed of a length of low impedance transmission line L ($La_1$, etc.) terminated in an aerial coupling transformer T ($Ta_1$, etc.). The transformers $Ta_1$ and $Tc_1$ of bridge No. 1 are connected to a pair of diagonally opposite aerials A1 and A3. The second pair of transformers $Tb1$, $Td1$ in opposite arms of the bridge, have small condensers $Cb1$, $Cd1$ respectively, which are equal in capacity to the capacity of an aerial and connected across their primary windings in place of aerials. By making the four arms of similar components the bridge circuit will remain in balance over a wide range of frequencies. One pair of opposite corners of this bridge circuit 1 are connected to one field coil $FG11$ of goniometer $G1$ and the other pair of opposite corners to the corresponding field coil $FG21$ of goniometer $G2$.

The second bridge shown on the lower half of Fig. 1 is a similar circuit, by means of which aerials $A2$ and $A4$ feed respectively field coil $FG12$ of goniometer $G1$ and the corresponding field coil $FG22$ of goniometer $G2$ and in this case condensers $Ca2$, $Cc2$ of capacity equal to the capacity of an aerial are connected respectively across the primary windings of transformers $Ta2$, $Tc2$. The search coils of the goniometers are indicated at $SG1$ and $SG2$.

When obtaining a bearing on a distant transmitter with an Adcock direction finder an indication may be given by a minimum signal, which is rendered more accurate by the addition of a quadrature zero clearing voltage producing a point of zero signal. Also, to avoid ambiguity a sense voltage is necessary. The above voltage is obtained in known manner from the fifth non-directional aerial, and has to be applied to both receiving equipments.

Once again, each equipment must not influence the other and the following arrangements for introducing the voltage from the fifth aerial to each of the goniometers $G1$, $G2$ preclude the possibility of this happening.

The equipments are coupled to the common aerial input by thermionic valves acting as buffer amplifiers, and this makes the two equipments independent of each other.

The second arrangement comprises a bridge circuit similar to those already described and is illustrated in Fig. 2. One arm $a3$ of the bridge 3 is fed by a transmission line $La3$ from the non-directional aerial designated $A5$, and the transmission lines L of the other three arms $b3$, $c3$, $d3$ are terminated in transformers across the primary windings of which are connected small condensers of capacity equal to the capacity of the aerial $A5$. The inputs from the "sense" aerial $A5$ to the two equipments are taken from the opposite corners of the bridge as shown in Fig. 2 and connected to the respective equipments in well known manner.

What is claimed is:

1. In a radio direction finding apparatus two spaced non-directional aerials, two direction-finding equipments, an impedance bridge, means for coupling one aerial to a first arm of said bridge, means for coupling the other aerial to a second opposite arm of said bridge, impedances in the third and fourth arms of said bridge of such kind and magnitude as to balance said bridge, a connection from one pair of opposite corners of said bridge to one said equipment and a connection from the other pair of opposite corners of said bridge to the other said equipment.

2. In a radio direction finding apparatus, two spaced non-directional aerials, two radio goniometers each having a field coil and a search coil, an impedance bridge, means for coupling one aerial to a first arm of said bridge, means for coupling the other aerial to a second opposite arm of said bridge, impedances in the third and fourth arms of said bridge of such kind and magnitude as to balance said bridge, a connection from one pair of opposite corners of said bridge to the field coil of one of said goniometers and a connection from the other pair of opposite corners of said bridge to the search coil of the other goniometer.

3. In a radio direction finding apparatus, four non-directional aerials located at the corners of a square, two direction determining equipments each comprising a goniometer having a pair of field coils and a search coil, first and second impedance bridge circuits, means for coupling a first pair of diagonally opposite aerials respectively to opposite arms of said first bridge, balancing impedances in the other arms of said first bridge, means for coupling a second pair of diagonally opposite aerials respectively to opposite arms of said second bridge, balancing impedances in the other arms of said second bridge, connections from two diagonals of said first bridge respectively to a field coil of each said goniometer, and connections from the two diagonals of said second bridge respectively to the other field coil of each said goniometer.

4. Direction finding apparatus according to claim 3, further comprising a fifth non-directional aerial for sense determination, a further impedance bridge, means for coupling said fifth aerial to one arm of said further bridge, balancing impedances in the other three arms of said further bridge, and connections extending respectively from the two diagonals of said further bridge to said two direction determining equipments.

5. Direction finding apparatus according to claim 3, wherein each bridge arm coupled to an aerial comprises a transmission line coupled to the relative aerial, and each of the remaining bridge arms comprises a transmission line coupled to a condenser the capacity of which is equal to the capacity of an aerial, all said transmission lines being similar in all respects.

6. Direction finding apparatus according to claim 3, wherein each bridge arm coupled to an aerial comprises a transmission line coupled to the relative aerial and each of the remaining bridge arms comprises a transmission line coupled to a condenser the capacity of which is equal to the capacity of an aerial, and wherein transformers are provided for coupling said transmission lines to said aerials and to said condensers.

7. Direction finding apparatus according to claim 3, further comprising a fifth non-directional aerial for sense determination, a further impedance bridge, means for coupling said fifth aerial to one arm of said further bridge, balancing impedances in the other three arms of said further bridge and connections each including a thermionic amplifier buffer stage extending respectively from the two diagonals of said further bridge to said two direction determining equipments

CHARLES WILLIAM EARP.
IVOR REGINALD JOHN JAMES.
RICHARD FRANCIS CLEAVER.

REFERENCES CITED

The following references are of record in the file of this patent:

UNITED STATES PATENTS

| Number | Name | Date |
| --- | --- | --- |
| 1,867,232 | Roberts | July 12, 1932 |